US011148470B2

(12) United States Patent
Pannikottu et al.

(10) Patent No.: US 11,148,470 B2
(45) Date of Patent: Oct. 19, 2021

(54) ZERO-PRESSURE TIRE

(71) Applicant: American Engineering Group LLC, Akron, OH (US)

(72) Inventors: Abraham Pannikottu, Akron, OH (US); Jon Gerhardt, Stow, OH (US)

(73) Assignee: AMERICAN ENGINEERING GROUP LLC, Akron, OH (US)

( * ) Notice: Subject to any disclaimer, the term of this patent is extended or adjusted under 35 U.S.C. 154(b) by 618 days.

(21) Appl. No.: 16/044,589

(22) Filed: Jul. 25, 2018

(65) Prior Publication Data
US 2018/0326787 A1 Nov. 15, 2018

Related U.S. Application Data

(63) Continuation-in-part of application No. 14/564,595, filed on Dec. 9, 2014, now abandoned.
(Continued)

(51) Int. Cl.
| | |
|---|---|
| *B60C 11/00* | (2006.01) |
| *B60C 9/16* | (2006.01) |
| *B60C 9/00* | (2006.01) |
| *B60C 9/04* | (2006.01) |
| *B32B 1/08* | (2006.01) |

(Continued)

(52) U.S. Cl.
CPC ............ *B60C 9/16* (2013.01); *B60C 9/005* (2013.01); *B60C 9/0007* (2013.01); *B60C 9/0028* (2013.01); *B60C 9/04* (2013.01); *B60C 11/005* (2013.01); *B32B 1/08* (2013.01);
(Continued)

(58) Field of Classification Search
CPC ............... B60C 11/005; B60C 11/0041; B60C 2009/1857; B60C 2009/2214; B60C 9/22; B60C 9/2204; B60C 2017/0081
See application file for complete search history.

(56) References Cited

U.S. PATENT DOCUMENTS 3,867,973 A * 2/1975 Cozzolino ............... B60C 23/18
152/153
4,111,249 A 9/1978 Markow
(Continued)

FOREIGN PATENT DOCUMENTS

| FR | 2645799 A1 * 10/1990 ............ B60C 11/24 |
| GB | 1056878 A * 2/1967 ............... B60C 9/20 |

(Continued)

OTHER PUBLICATIONS

Machine Translation:JP-2011173564-A,Suzuki, Yasuyuki, (Year: 2021).*
(Continued)

*Primary Examiner* — Kendra Ly
(74) *Attorney, Agent, or Firm* — Jacob M. Ward; Ward Law Office LLC

(57) ABSTRACT

A pneumatic radial tire includes a carcass structure having a pair of sidewalls and a crown, a pair of beads, a tread, a belt structure, and a plurality of reinforcing hoops. The plurality of spaced apart reinforcing hoops are disposed intermediate the crown of the carcass structure and the tread, and are formed of a rigid material coated in an elastomeric material. The plurality of reinforcing hoops includes a pair of outer reinforcing hoops disposed adjacent the sidewalls of the carcass, and an at least one inner reinforcing hoop disposed between the outer reinforcing hoops.

16 Claims, 4 Drawing Sheets

Related U.S. Application Data

(60) Provisional application No. 61/970,624, filed on Mar. 26, 2014.

(51) Int. Cl.
  *B60C 17/00* (2006.01)
  *B60C 9/22* (2006.01)

(52) U.S. Cl.
  CPC ............... *B60C 2009/2214* (2013.01); *B60C 2017/0081* (2013.01)

(56) References Cited

U.S. PATENT DOCUMENTS

| | | | |
|---|---|---|---|
| 5,385,188 A | 1/1995 | Kogure et al. | |
| 2009/0101266 A1* | 4/2009 | Barguet | D07B 1/062 152/527 |
| 2011/0198006 A1 | 8/2011 | Asayama | |

FOREIGN PATENT DOCUMENTS

| | | | | |
|---|---|---|---|---|
| JP | 04306103 A | * | 10/1992 | |
| JP | 2004284552 A | | 10/2004 | |
| JP | 2005035345 A | | 2/2005 | |
| JP | 2011173564 A | * | 9/2011 | |
| JP | 2014189172 A | * | 10/2014 | ............... D02G 3/48 |
| KR | 1020020039980 | * | 5/2002 | |
| KR | 1020040051721 | * | 6/2004 | |

OTHER PUBLICATIONS

Machine Translation: JP-2014189172-A, Takenaka Yuichi, (Year: 2021).*
Machine Translation: FR-2645799-A1, N/A, (Year: 2021).*
Machine Translation: JP-04306103-A, Haneda, Tsukasa, (Year: 2021).*
Machine Translation: KR1020040051721, Choung, Soosik, (Year: 2021).*
Machine Translation: KR1020020039980, Nam, Jin, (Year: 2021).*

* cited by examiner

ZERO-PRESSURE TIRE

CROSS-REFERENCE TO RELATED APPLICATIONS

This application is a continuation-in-part of U.S. patent application Ser. No. 14/564,595, filed on Dec. 9, 2014, which in turn claims the benefit of U.S. Provisional Application No. 61/970,624, filed on Mar. 26, 2014. The entire disclosures of the above applications are hereby incorporated herein by reference.

FIELD

The present disclosure relates to pneumatic tires and, more particularly, to reinforced zero-pressure pneumatic radial tires.

BACKGROUND

Various methods have been developed to enable the safe, continued operation of under-inflated or deflated tires, allowing an operator to safely drive a vehicle until repair or replacement of the tire can be accomplished. These tires, commonly referred to as "zero-pressure" or "run flat" tires, are used in a variety of applications ranging from passenger cars to military vehicles.

The majority of zero-pressure tires are constructed with reinforcing layers inserted into the sidewalls to increase stiffness. Zero-pressure tires having stiffened sidewalls function via sidewall compression, and upon deflation of the tire the weight of the vehicle is supported by the portion of the sidewall that is beneath the axle. However, the use of sidewall reinforcing layers becomes undesirable for higher profile tires, as the stiffness of the sidewall must be increased to accommodate greater bending stresses. This results in sacrificed ride quality.

To allow for reduced sidewall stiffness in higher profile tires, it has been discovered that increasing the circumferential rigidity of a tire allows a deflated tire to support the weight of a vehicle via sidewall tension, not compression. By increasing circumferential rigidity, the tire retains a substantially round circumference when deflated, and the sidewalls of the tire remain in tension. Because the sidewalls rely only on tension to support the weight of the vehicle, the stiffness of the sidewalls does not need to be increased to the extent of zero-pressure tires that rely only on sidewall compression to support vehicle weight. This allows for improved ride quality.

To provide increased circumferential rigidity, some tires have been constructed having thin annular bands placed beneath the tread of the tire. The annular bands are approximately the width of the tread of the tire. However, this construction is unreliable, as the wide annular bands are subject to high interlaminar shear that is generated within the primary neutral bending axis, which can result in tire failure over time.

There is a continuing need for a pneumatic radial tire that allows for increased circumferential rigidity, while reducing interlaminar shear and related failures.

SUMMARY

In concordance with the instant disclosure, a pneumatic radial tire that allows for increased circumferential rigidity and reduces interlaminar shear is surprisingly discovered.

The pneumatic radial tire comprises a carcass structure, a pair of beads, a tread, a belt structure, and a plurality of reinforcing hoops. The carcass structure includes at least one body ply forming a crown and a pair of sidewalls. The pair of sidewalls extend radially inwardly from the crown. The tread is disposed radially outwardly of the crown of the carcass. The belt structure and a plurality of spaced apart reinforcing hoops are disposed intermediate the crown in the tread.

The plurality of reinforcing hoops may have any one of a rectangular cross-sectional shape, a tapered cross-sectional shape, and a curved cross-sectional shape. A radial thickness each of the plurality of reinforcing hoops is less than 40% of a radial thickness of the tread, and ideally between 20% and 25% of the radial thickness of the tread. An axial width of the reinforcing hoops is greater than 5% of an axial width of the tread, and ideally between 5% and 25% of the width of the tread.

The plurality of reinforcing hoops includes a pair of outer hoops and at least one inner hoop, wherein the outer hoops are disposed adjacent the sidewalls of the carcass, and the at least one inner hoop is intermediate the outer hoops. The plurality of reinforcing hoops may be of a congruent diameter, wherein each of the plurality of reinforcing hoops is axially aligned. Alternatively, the plurality of reinforcing hoops may be of different diameters, wherein the hoops are aligned along an arc. Furthermore, the plurality of reinforcing hoops may be axially spaced symmetrically or asymmetrically with respect to an equatorial plane of the tire.

The reinforcing hoops are constructed of a rigid material and coated in an elastomeric material. The elastomeric coating increases bond strength between the reinforcing hoops and the adjacent tire structure, and allows each of the reinforcing hoops to float within the tire structure. By floating within the tire, the hoops are more forgiving, and less prone to interlaminar shear. The rigid material may be any one of a composite fiber, a carbon fiber, an ultra-high-molecular-weight polyethylene, and an epoxy resin composite filled with reinforcement fibers.

In an exemplary embodiment, a pneumatic radial tire includes a carcass, a tread, at least one belt, and a plurality of reinforcing hoops. The carcass is formed of at least one body ply and sidewalls. The tread is disposed radially outwardly of the at least one body ply. The tread includes a top tread portion and a cushion portion. The at least one belt is disposed radially intermediate the at least one body ply and the cushion portion of the tread. The plurality of reinforcing hoops are embedded within the tread and disposed radially intermediate the cushion portion and the top tread portion of the tread. Each of the reinforcing hoops includes both a metal ring and non-metal reinforcing fibers.

The metal ring may be formed of one of a solid ring and a continuously wound wire. For example, the metal ring of each of the reinforcing hoops may be formed from steel. In a particular example, the metal ring is formed from brass coated steel wire. The non-metal reinforcing fibers may include at least one of a composite fiber, a carbon fiber, an ultra-high-molecular-weight polyethylene, and an epoxy resin composite filled with reinforcement fibers. For example, the non-metal reinforcing fibers are carbon fibers. In a particular example, each of the reinforcing hoops includes a first carbon fiber layer and a second carbon fiber layer.

The metal ring of each of the reinforcing hoops may further have a skim rubber coating. The skim rubber coating provides enhanced adhesion between the metal ring and the non-metal reinforcing fibers. For example, the skim rubber coating may include a methylene donor/methylene acceptor resin system.

The tread may further include a base tread portion, a cushion filler portion, and a rubber base portion. The base tread portion may be disposed between and contacts the cushion portion and the cushion filler portion of the tread. The rubber base portion may be disposed between the cushion filler portion and the top tread portion. The base tread portion may further have grooves. The reinforcing hoops may be disposed within the grooves of the base tread portion. A portion of the cushion filler may extend into the grooves between the reinforcing hoops and the base tread portion.

Where the reinforcing hoops include the first carbon fiber layer and the second carbon fiber layer, the first carbon layer may be disposed over the reinforcing hoop between the skim rubber coating and the cushion filler portion of the tread. The second carbon layer may be disposed under the reinforcing hoop between the skim rubber coating and the cushion portion of the tread.

The plurality of reinforcing hoops may include a pair of outer reinforcing hoops disposed adjacent to the sidewalls. At least one inner reinforcing hoop may be disposed axially intermediate the pair of outer reinforcing hoops. A radial thickness of the outer hoops may be less than a radial thickness of the at least one inner hoop.

Each of the plurality of reinforcing hoops may have a radial thickness that is between 20% and 25% of a radial thickness of the tread. Each of the plurality of reinforcing hoops may have an axial width that is between 5% and 25% of an axial width of the tread.

At least one of the plurality of reinforcing hoops may further be one of substantially circular in cross sectional shape and substantially rectangular in cross sectional shape.

BRIEF DESCRIPTION OF THE DRAWINGS

The above, as well as other advantages of the present disclosure, will become readily apparent to those skilled in the art from the following detailed description, particularly when considered in the light of the drawings described herein.

DETAILED DESCRIPTION

Figure 1:
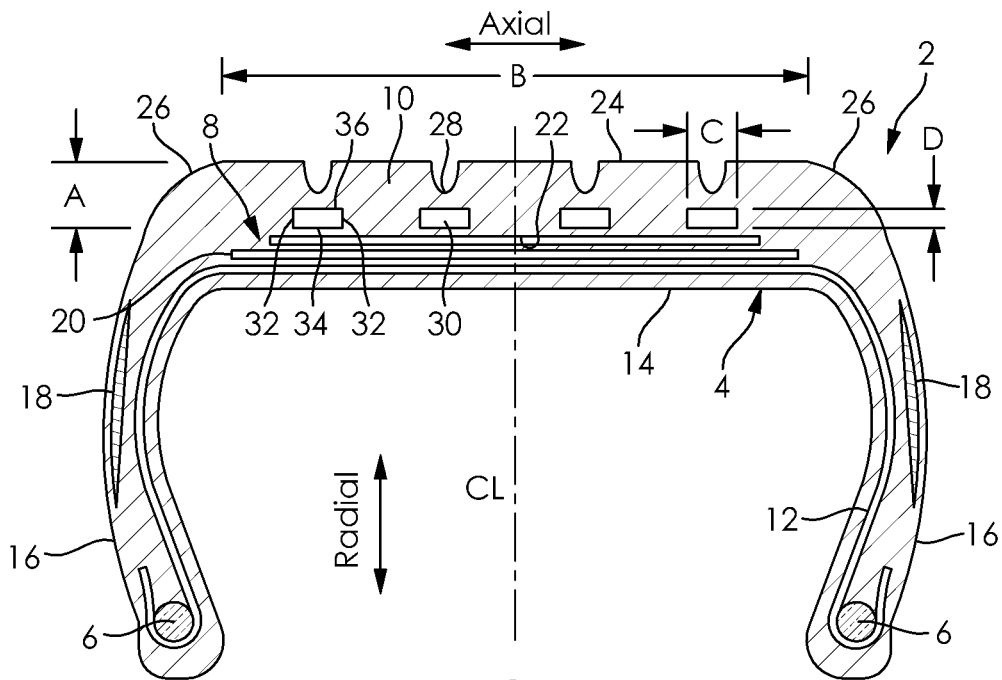
FIG. 1 is a cross-sectional view of a pneumatic radial tire having a plurality of reinforcing hoops, wherein the reinforcing hoops are of a congruent diameter.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical unless otherwise disclosed.

In FIGS. 1-5, a cross-section of a pneumatic radial tire 2 capable of operating in a zero-pressure condition is shown. The tire 2 is substantially constructed using conventional methods, and includes a carcass 4, a pair of annular beads 6, a belt structure 8, and a tread 10, as they are generally known in the art.

The carcass 4 is formed of at least one reinforced elastomeric radial body ply 12 and includes an outer peripheral crown 14, and a pair of sidewalls 16 including a first sidewall and a second sidewall. The first sidewall and second sidewall extend radially inwardly from respective first and second ends of the crown 14. A portion of the body ply 12 that forms each respective sidewall 16 is turned up over the respective annular beads 6. One of the annular beads 6 is encompassed by one of the respective sidewalls 16. The annular beads 6 may be constructed of any one of a variety of conventional means known in the art, such as a spiral wound wire or a braided cable, as nonlimiting examples.

Each of the respective sidewalls 16 may further include at least one reinforcing insert 18 to increase the stiffness of the sidewall 16. In one embodiment, the reinforcing inserts 18 may be integrally molded with the sidewalls 16, axially outwardly of the body ply 12, as shown in FIGS. 1-5. In alternative embodiments, the reinforcing inserts 18 may be encompassed by the at least one body ply 12. Particularly, where a plurality of body plies 12 form the sidewalls 16, the reinforcing inserts 18 may be disposed intermediate a first body ply 12 and a second body ply 12, for example. Other configurations for the reinforcing inserts 18 are also within the scope of the present disclosure.

The reinforcing inserts 18 may be formed of any material having a high modulus. Inserts 18 formed of a fiber reinforced rubber or polymer have been found particularly effective. The reinforcing fibers may be formed of any one of glass, carbon, nylon, aramid, rayon, or polyester, for example.

The belt structure 8 includes an at least one metallic belt formed in an elastomeric material, and stacked radially outwardly of the crown 14 of the carcass 4, wherein the belt structure 8 circumscribes the crown 14. In the embodiment of FIG. 1, the belt structure 8 includes a first belt 20, and a second belt 20 stacked adjacent to the first belt 20. However, it should be understood that any number of belts 20 may be consecutively layered in order to increase the strength and resilience of the tire 2, as desired.

The tread 10 is disposed radially outwardly of the belt structure 8, and is formed of an elastomeric material. The tread 10 may include a tread rubber compound that provides a sufficient degree of wear and traction, with a thin underlying layer of base rubber compound that provides a sufficient adhesion of the tread 10 to the underlying belt structure 8, for example.

A thickness of the tread 10 (dimension A) is defined by a radial distance between an inner surface 22 and an outer surface 24. A width of the tread 10 (dimension B) is defined by an axial distance between shoulders 26. A tread pattern 28 may be formed in the outer surface 24 of the tread 10.

As shown in FIGS. 1-5, a plurality of reinforcing hoops 30 are disposed within the tire 2, and are configured to permit for operation of the tire 2 in a zero-pressure condition. The reinforcing hoops 30 are disposed radially intermediate the belt structure 8 and the tread 10, and more particularly are embedded within the tread 10 radially outwardly from the belt structure 8. At least a portion of each of the reinforcing hoops 30 is integrally formed in the tread 10. However, in alternate embodiments, the reinforcing hoops 30 may be disposed radially intermediate the belt structure 8 and the crown 14. In yet another embodiment, the reinforcing hoops 30 may be disposed both radially intermediate the belt structure 8 and the crown 14, and the belt structure 8 and the tread 10.

A width (dimension C) of each of the plurality of reinforcing hoops 30 is defined by an axial distance between opposing first and second sides 32 of each of the reinforcing hoops 30. A thickness (dimension D) of each of the plurality of hoops 30 is defined as a radial distance between an inner surface 34 and an outer surface 36 of each of the reinforcing hoops 30.

In the illustrated embodiments, the thickness of each of the plurality of reinforcing hoops 30 is less than 40% of the thickness of the tread 10, and particularly between 20% and 25% of the thickness of the tread 10. Optimally, the width of each of the hoops 30 is at least 5% of the width of the tread 10, and particularly between 5% and 25% of the width of the tread 10. Other shapes and dimensions for the reinforcing hoops 30 are also contemplated and considered within the scope of the present disclosure.

In a first embodiment, at least one of the plurality of reinforcing hoops 30 may have a substantially rectangular cross sectional shape wherein each of the sides 32, the inner surface 34, and the outer surface 36 is substantially planar, as shown in FIGS. 1-5. In an alternate embodiment, at least one of the plurality of reinforcing hoops 30 may be tapered, wherein the thickness of the reinforcing hoop 30 decreases along the width of the reinforcing hoop 30. In yet another embodiment, at least one of the plurality of reinforcing hoops 30 may include at least one of a convex outer surface 36 and a concave inner surface 34, wherein the cross sectional shape of the reinforcing hoop 30 is curved.

Figure 4:
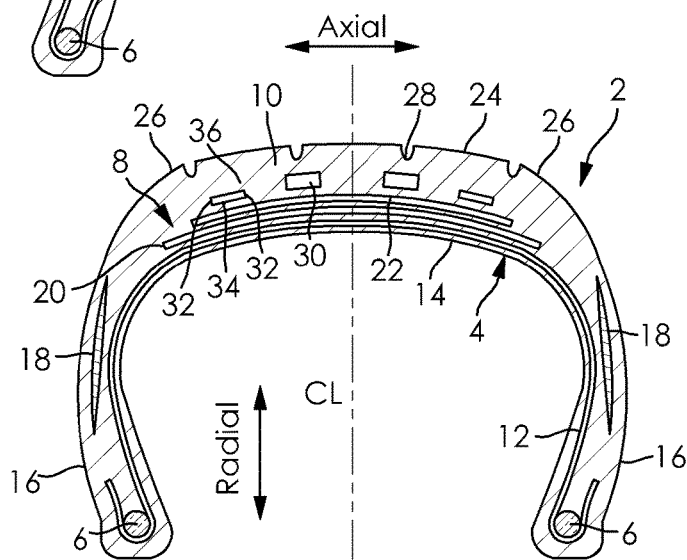
FIG. 4 is a cross-sectional view of a pneumatic radial tire having a plurality of reinforcing hoops, wherein the reinforcing hoops are aligned along an outer surface.
Figure 5:
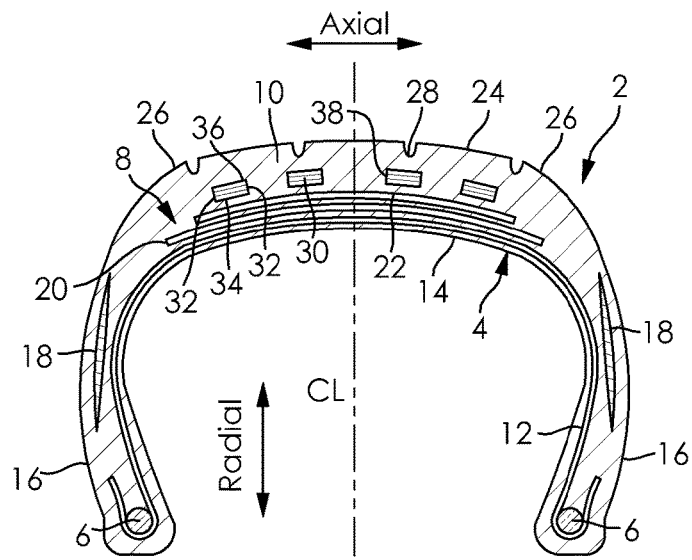
FIG. 5 is a cross-sectional view of a pneumatic radial tire having a plurality of reinforcing hoops, wherein the reinforcing hoops include a plurality of layers.

The reinforcing hoops 30 are constructed of a sufficiently rigid material. In a first embodiment, as shown in FIGS. 1-4, the rigid material is solidly formed, wherein the cross section of the reinforcing hoop 30 is homogenous. In another embodiment, as shown in FIG. 5, the rigid material is circumferentially wound until to obtain a desired radial thickness and axial width, wherein the cross section of the reinforcing hoop 30 includes a plurality of layers 38.

The rigid material may be a fiber reinforced material, such as a carbon fiber material, a composite fiber material, an ultra-high molecular-weight polyethylene material, or an epoxy-resin impregnated with reinforcing fibers, for example. The reinforcing fibers are formed of a high modulus material, glass, nylon, rayon, polyester, aramid, or glass, for example.

It is also contemplated that the rigid material of the hoops 30 may include metal, either alone or in addition to the fiber reinforced material. For example, the hoops 30 may be formed from brass coated steel wire. Similar to the annular beads 6, the hoops 30 may be constructed of any one of a variety of conventional means known in the art, such as a spiral wound wire or a braided cable, as nonlimiting examples. Other suitable types of metal wire and windings may also be used for the hoops 30, as desired.

The metal hoops 30 may also be coated with a skim rubber compound that provides for enhanced adhesion between the metal wire of the hoops 30 and at least one of the reinforcing fibers and the tread 10. As nonlimiting examples, the skim rubber compound may include a methylene donor/methylene acceptor resin system such as HMMM as the donor and a novolac resin as the acceptor. Cobalt may also be used in addition to these resin systems, or added by itself to the skim rubber compound with a high level of sulfur to improve adhesion. Other materials and formulations for the skim rubber compound may be selected by a skilled artisan within the scope of the present disclosure.

The plurality of reinforcing hoops 30 includes at least a pair of outer reinforcing hoops 30, each of which are disposed adjacent the respective sidewalls 16 of the tire 2. The plurality of reinforcing hoops 30 further includes at least one inner reinforcing hoop 30, disposed intermediate the outer reinforcing hoops 30. As illustrated in FIGS. 1-5, the plurality of reinforcing hoops 30 includes a plurality, and more specifically, a pair of inner reinforcing hoops 30, disposed intermediate the pair of outer reinforcing hoops 30.

Figure 2:
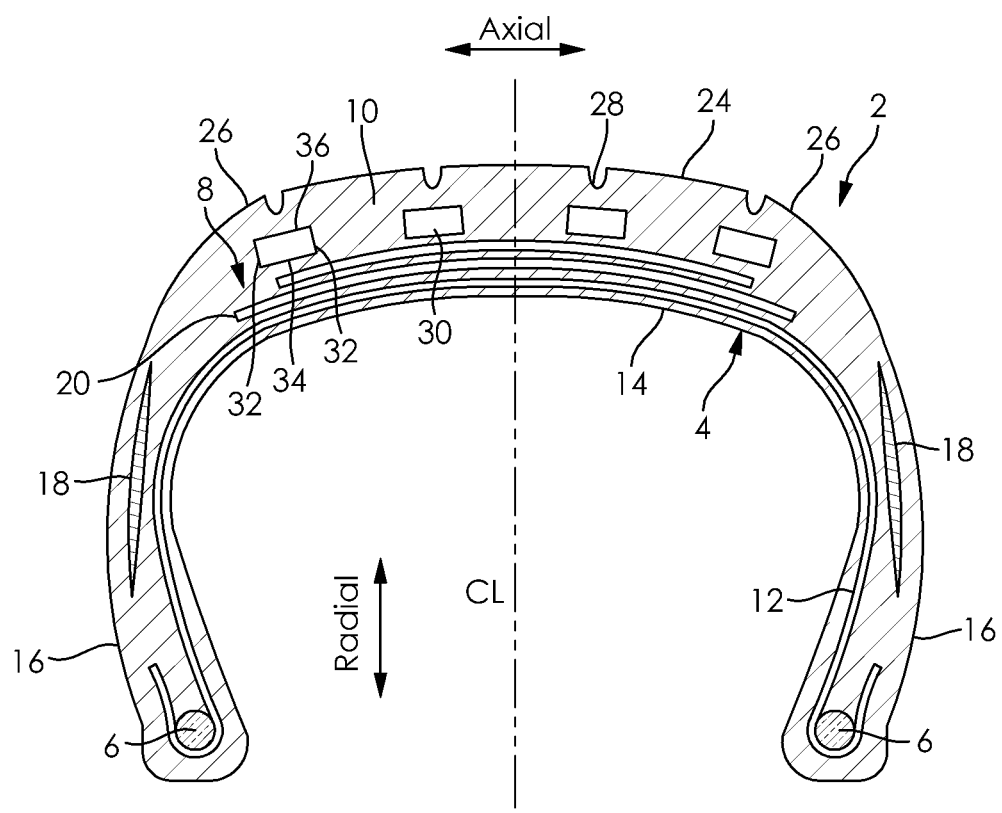
FIG. 2 is a cross-sectional view of a pneumatic radial tire having a plurality of reinforcing hoops, wherein the reinforcing hoops are aligned along an arc of the tire.

As shown in FIGS. 1, 2, and 5, each of the plurality of reinforcing hoops 30 may have a substantially similar cross sectional shape, with the thickness and width of each of the reinforcing hoops 30 being substantially similar. Alternatively, at least one of the plurality of reinforcing hoops 30 may have a thickness or width different than the radial thickness of at least one other reinforcing hoop 30. For example, as shown in FIGS. 3 and 4, the outer reinforcing hoops 30 are of a lesser thickness than the inner reinforcing hoops 30.

As shown in FIGS. 1, 2, 4, and 5, the plurality of reinforcing hoops 30 may be axially spaced symmetrically about an equatorial plane (CL) of the tire 2. While an even number of reinforcing hoops 30 is illustrated, the plurality of reinforcing hoops 30 may include an odd number of reinforcing hoops 30, wherein a single reinforcing hoop 30 is centered on the equatorial plane of the tire 2. In an alternative embodiment, as shown in FIG. 3, the axial spacing of the plurality of reinforcing hoops 30 may be asymmetric with respect to the equatorial plane of the tire 2.

In the embodiment shown in FIG. 1, each of the plurality hoops is of a congruent diameter, wherein each one of the reinforcing hoops 30 is in axial alignment with each other, wherein the plurality of hoops 30 is flat. In alternate embodiments, as shown in FIGS. 2-5, the outer reinforcing hoops 30 are of a lesser diameter than the inner reinforcing hoops 30, wherein the plurality of reinforcing hoops 30 forms an arc.

Figure 3:
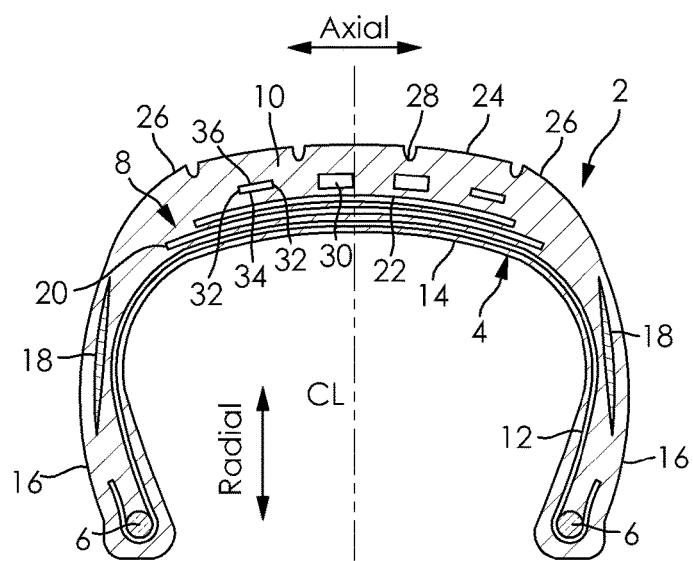
FIG. 3 is a cross-sectional view of a pneumatic radial tire having a plurality of hoops, wherein the reinforcing hoops have different radial thicknesses and are asymmetrically spaced from an equatorial plane of the tire.

In the embodiment shown in FIGS. 2, 3, and 5, the thickness of each of the reinforcing hoops 30 is centrally aligned along the arc, wherein the inner surface 34 and the outer surface 36 of each reinforcing hoop 30 is an equidistance from the arc. Alternatively, the plurality of reinforcing hoops 30 may be radially offset, wherein one of the inner surfaces 34 or the outer surfaces 36 of each of the reinforcing hoops 30 are tangentially aligned with the arc.

In manufacture of the tire 2 according to the present disclosure, it should be appreciated that the tread rubber forming the tread 10 may overlay the reinforcing hoops 30, which are in turn disposed over the carcass adjacent the belt structure 8, prior to curing. In other embodiments, the reinforcing hoops 30 are disposed within grooves formed in the tread rubber forming the tread 10 prior to curing. During the curing process, and under pressure from the molds, the reinforcing hoops 30 are subsequently embedded within the tread 10. Other means for disposing the reinforcing hoops 30 within the tire 2 are also within the scope of the present disclosure.

Figure 6:
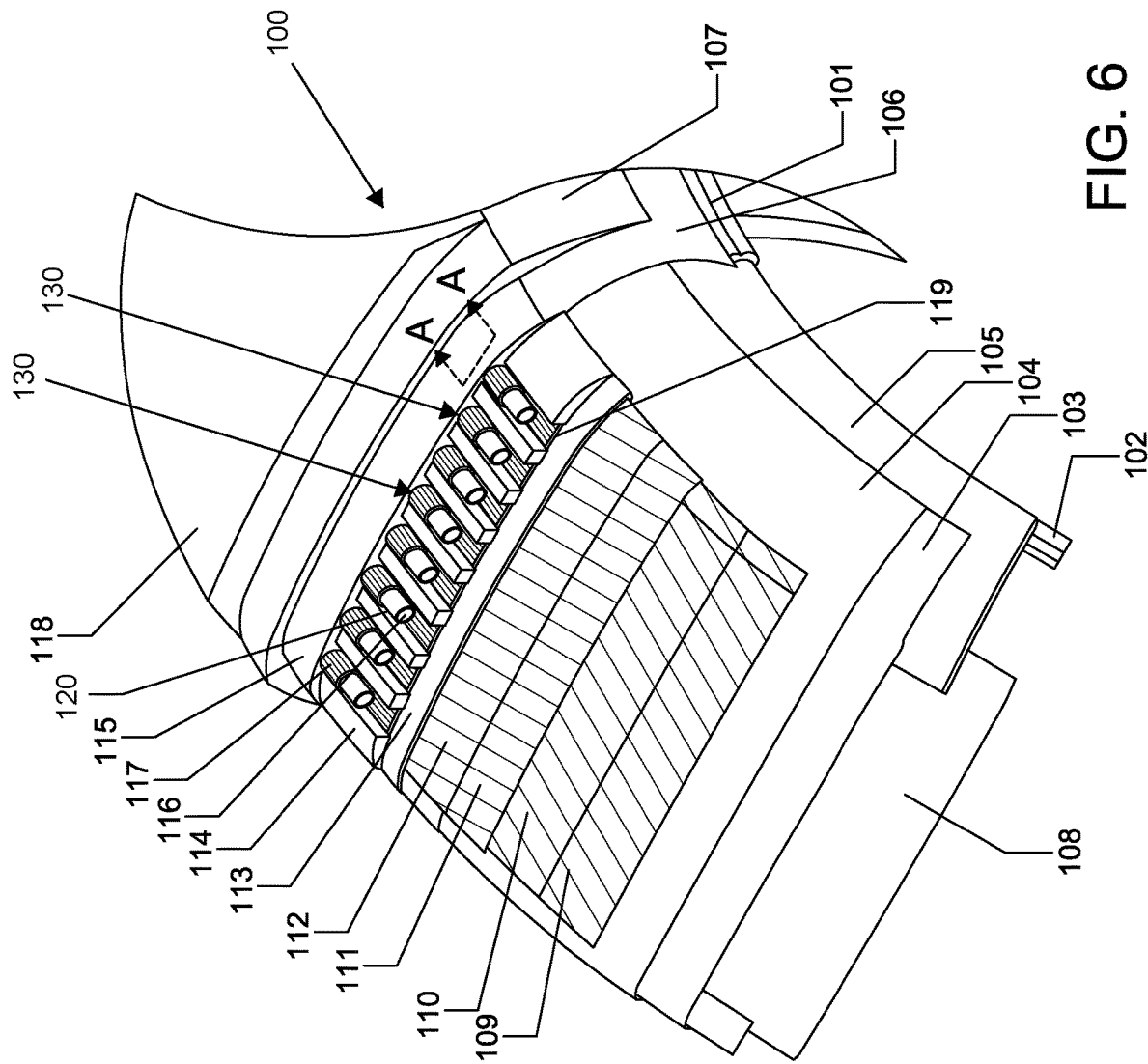
FIG. 6 is a partial top perspective view of a pneumatic radial tire according to one embodiment of the disclosure, shown with portions of layers removed in order to further illustrate the different layers of the tire.
Figure 7:
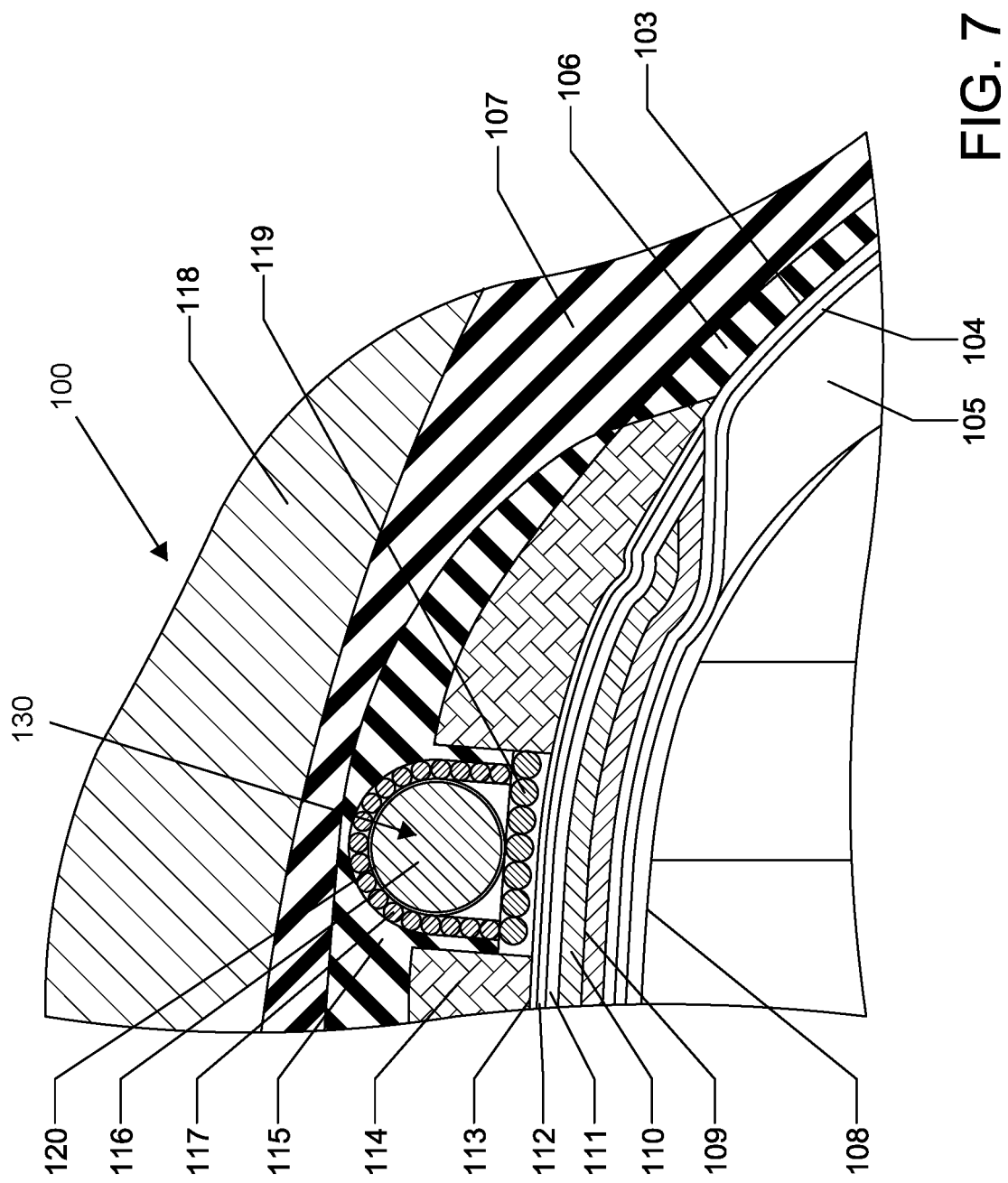
FIG. 7 is a cross-sectional side elevational view of the tire taken at section line A-A in FIG. 6.

In FIGS. 6-7, a particular example of a pneumatic radial tire 100 according to the present disclosure is shown. The tire 100 is capable of operating in a zero-pressure condition. The tire 100 corresponds generally to the tire 2 described hereinabove with respect to FIGS. 1-5. The tire 100 includes a chafer 101, a pair of annular beads 102, a second body ply 103, a first body ply 104, a filler 105, a sidewall 106, an inner liner 108, a first steel belt 109, a second steel belt 110, a first rayon belt 111, and a second rayon belt 112. These various tire components may be constructed using conventional methods as are generally known in the art.

Advantageously, and as also described hereinabove with respect to the tire 2 shown in FIGS. 1-5, the tire 100 has a plurality of reinforcing hoops 130. The hoops 30 described hereinabove with respect to the tire 2, and shown in FIGS. 1-5, generally correspond with the reinforcing hoops 130 described hereinbelow with respect to the tire 100, and shown in FIGS. 6-7. Likewise, the tread 10 described hereinabove with respect to tire 2, and shown in FIGS. 1-5, generally corresponds with the assembly of tread components described hereinbelow with respect to the tire 100, and shown in FIGS. 6-7, including a rubber base 107, a cushion 113, a base tread 114, a cushion filler 115, and a top tread 118.

The cooperation of these various tread components with the reinforcing hoops 130 according to one particular embodiment is further described hereinbelow. It should be appreciated that the various tread components including the rubber base 107, the cushion 113, the base tread 114, the cushion filler 115, and the top tread 118 may be compounded differently according to their desired use in the tire. For example, each of the base tread 114 and the cushion 113 may be provided with tackifiers that facilitate an adhesion of the overall tread 10 to the belts 109, 110, 111, 112 of the tire prior to a curing operation. The base tread 114 and the cushion 113 may likewise have a cured stress/strain modulus that is intermediate that of the top tread 118 and the rubber coating the belts 109, 110, 11, 112. The cushion filler 115 is disposed over top of the hoops 1130 and may be compounded so as to maximize adhesion with at least one of the metal ring 116 and the carbon fibers 117 of the hoops 130. The cushion filler 115 may have a cured stress/strain modulus that is intermediate that of the base tread 114 and the top tread 116. The rubber base 107 is additionally compounded with tackifiers that facilitate an adhesion of the rubber base 107 to the cushion filler 115 prior to the curing operation. The rubber base 107 may have a cured stress/strain modulus that is intermediate that of the cushion filler 115 and the top tread 118. The top tread 118 may be compounded for suitable wear and cutting/chipping resistance in operation. Other suitable physical characteristics for the uncured and cured tread components including the rubber base 107, the cushion 113, the base tread 114, the cushion filler 115, and the top tread 118 may also be employed by a skilled artisan within the scope of the present disclosure.

As shown in FIGS. 6-7, the plurality of reinforcing hoops 130 are embedded within the tread of the tire 100. For example, the reinforcing hoops 130 are disposed within grooves formed in the base tread 114 of the tire 100. The reinforcing hoops 130 are also spaced apart from one another across an axial width of the tire 100 between the opposite sidewalls 106 of the tire 100 and radially outwardly from the belts 109, 110 of the tire 100. In particular, the reinforcing hoops 130 may be disposed in both the base tread 114 and the cushion filler 115 in between the cushion 113 and the rubber base 107 of the top tread 118.

The individual reinforcing hoops 130 may include both a metal ring 116 (such as steel) and carbon fiber 117, 119. The carbon fiber 117, 119 is configured to reinforce the metal ring 116. In particular, the carbon fiber 117, 119 may include a first carbon fiber layer 117 and a second carbon fiber layer 119. The first carbon fiber layer 117 is disposed on a top portion of the metal ring 116, between the metal ring 116 and the cushion filler 116 of the tread. The second carbon fiber layer 119 is disposed on a bottom portion of the metal ring 116, between the metal ring 116 and the cushion 113 of the tread.

The metal ring 116 may further have a skim rubber layer 120 as also described hereinabove. The skim rubber layer 120 provides an enhanced adhesion with the carbon fiber 117, 119. The skim rubber layer 120 may be disposed between the metal ring 116 and the carbon fiber 117, 119. The skim rubber coating 120 may include a methylene donor/methylene acceptor resin system such as HMMM as the donor and a novolac resin as the acceptor. Cobalt may also be used in addition to these resin systems, or added by itself to the skim rubber compound with a high level of sulfur to improve adhesion. One of ordinary skill in the art may also select other suitable additives to enhance the adhesion of the carbon fiber 117, 119 with the metal ring 116 and the surrounding tread, as desired.

Advantageously the tire 2, 100 described hereinabove employs spaced apart reinforcing hoops 30, 130 between the crown of the carcass structure and the top tread 118 of the tread, and more particularly embedded within the tread radially outwardly from the belt structure of the tire 2, 100. This allows for increased circumferential rigidity and reduces interlaminar shear. It should also be appreciated that the spaced apart placement of the reinforcing hoops 30, 130 means that the hoops 30, 130 are separated from and not rigidly connected to one another. This arrangement further provides for enhanced lateral and radial flexibility of individual ones of the hoops 30, 130 in operation, as opposed to the use of steel belts known in the art.

A non-limiting example of the tire is commercially available under the trademark PZT—PRESSURE ZERO TIRE®, manufactured by American Engineering Group LLC in Akron, Ohio.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A pneumatic radial tire comprising:
   a carcass formed of at least one body ply and sidewalls;
   a tread disposed radially outwardly of the at least one body ply, the tread including a top tread portion, a cushion portion, a base tread portion, and a cushion filler portion, the base tread portion disposed between and contacting the cushion portion and the cushion filler portion of the tread;
   at least one belt disposed radially intermediate the at least one body ply and the cushion portion of the tread; and
   a plurality of reinforcing hoops embedded within the tread and disposed radially intermediate the cushion portion and the top tread portion of the tread, each of the reinforcing hoops including both a metal ring and non-metal reinforcing fibers, wherein the base tread portion has grooves, the reinforcing hoops are disposed within the grooves of the base tread portion, and a portion of the cushion filler extends into the grooves between the reinforcing hoops and the base tread portion.

2. The pneumatic radial tire of claim 1, wherein the metal ring is formed of one of a solid ring and a continuously wound wire.

3. The pneumatic radial tire of claim 1, wherein the tread further includes a rubber base portion disposed between the cushion filler portion and the top tread portion.

4. The pneumatic radial tire of claim 1, wherein each of the plurality of reinforcing hoops has a radial thickness that is between 20% and 25% of a radial thickness of the tread.

5. The pneumatic radial tire of claim 1, wherein each of the plurality of reinforcing hoops has an axial width that is between 5% and 25% of an axial width of the tread.

6. The pneumatic radial tire of claim 1, wherein at least one of the plurality of reinforcing hoops is one of substantially circular in cross sectional shape and substantially rectangular in cross sectional shape.

7. The pneumatic radial tire of claim 1, wherein the metal ring of each of the reinforcing hoops is formed from steel.

8. The pneumatic radial tire of claim 7, wherein the metal ring is formed from brass coated steel wire.

9. The pneumatic radial tire of claim 1, wherein the non-metal reinforcing fibers include at least one of a composite fiber, a carbon fiber, an ultra-high-molecular-weight polyethylene, and an epoxy resin composite filled with reinforcement fibers.

10. The pneumatic radial tire of claim 9, wherein the non-metal reinforcing fibers are carbon fibers.

11. The pneumatic radial tire of claim 1, wherein the metal ring of each of the reinforcing hoops further has a skim rubber coating, the skim rubber coating providing enhanced adhesion between the metal ring and the non-metal reinforcing fibers.

12. The pneumatic radial tire of claim 11, wherein the skim rubber coating includes a methylene donor/methylene acceptor resin system.

13. The pneumatic radial tire of claim 11, wherein the non-metal reinforcing fibers are carbon fibers, and the non-metal reinforcing fibers of each of the reinforcing hoops includes a first carbon fiber layer and a second carbon fiber layer.

14. The pneumatic radial tire of claim 13, wherein the first carbon layer is disposed over the reinforcing hoop between the skim rubber coating and the cushion filler portion of the tread.

15. The pneumatic radial tire of claim 13, wherein the second carbon layer is disposed under the reinforcing hoop between the skim rubber coating and the cushion portion of the tread.

16. A pneumatic radial tire comprising:
a carcass formed of at least one body ply and sidewalls;
a tread disposed radially outwardly of the at least one body ply, the tread including a top tread portion and a cushion portion;
at least one belt disposed radially intermediate the at least one body ply and the cushion portion of the tread; and
a plurality of reinforcing hoops embedded within the tread and disposed radially intermediate the cushion portion and the top tread portion of the tread, each of the reinforcing hoops including both a metal ring and non-metal reinforcing fibers;
wherein the plurality of reinforcing hoops includes a pair of outer reinforcing hoops disposed adjacent to the sidewalls, at least one inner reinforcing hoop is disposed axially intermediate the pair of outer reinforcing hoops, and a radial thickness of the outer hoops is less than a radial thickness of the at least one inner hoop.

* * * * *